(12) United States Patent
Reyes

(10) Patent No.: US 6,293,787 B1
(45) Date of Patent: *Sep. 25, 2001

(54) METHOD OF REGULATING THE FLUE GAS TEMPERATURE AND VOLTAGE SUPPLY IN AN ELECTROSTATIC PRECIPITATOR FOR A CEMENT PRODUCTION PLANT

(75) Inventor: Victor Reyes, Valby (DK)

(73) Assignee: FLS Miljoa A/S (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,012

(22) PCT Filed: Jun. 17, 1997

(86) PCT No.: PCT/DK97/00262

§ 371 Date: Aug. 20, 1999

§ 102(e) Date: Aug. 20, 1999

(87) PCT Pub. No.: WO97/48652

PCT Pub. Date: Dec. 24, 1997

(30) Foreign Application Priority Data

Jun. 18, 1996 (DK) .................................. 0679/96

(51) Int. Cl.[7] .................................. F27B 15/00
(52) U.S. Cl. .................................. 432/14; 432/106; 110/215; 110/203; 62/171; 95/16; 95/23; 96/251; 96/252; 261/115; 261/DIG. 9

(58) Field of Search ................ 432/14, 106; 110/246, 110/215, 216, 217, 203; 62/171; 236/44 B; 95/16, 23; 96/251, 252; 261/115, 117, 118, DIG. 9

(56) References Cited

U.S. PATENT DOCUMENTS

| | | | |
|---|---|---|---|
| 3,842,615 | * 10/1974 | Reigel et al. | 62/171 |
| 4,184,886 | 1/1980 | Ellingen et al. | 106/100 |
| 4,626,261 | * 12/1986 | Jorgensen | 95/6 |
| 4,666,470 | * 5/1987 | Verduyn et al. | 95/10 |
| 5,169,611 | * 12/1992 | Kupper et al. | 423/210 |

* cited by examiner

Primary Examiner—Jiping Lu
(74) Attorney, Agent, or Firm—Baker Botts L.L.P.

(57) ABSTRACT

A cement production plant and method of regulating the flue gas temperature in a cement production plant. The cement production plant includes a kiln, a flue gas conditioning device, a mill and an electrostatic precipitator. The flue gas from the kiln is passed through the conditioning device. From there, the flue gas is conveyed either via the mill or directly to the electrostatic precipitator. The measurements are carried out in the flow path of the gas of the flue gas temperature before the electrostatic precipitator, and the water is supplied to the flue gas for cooling purposes in the conditioning device as a response to this temperature measurement, provided the temperature is too elevated.

4 Claims, 3 Drawing Sheets

Figure 1:
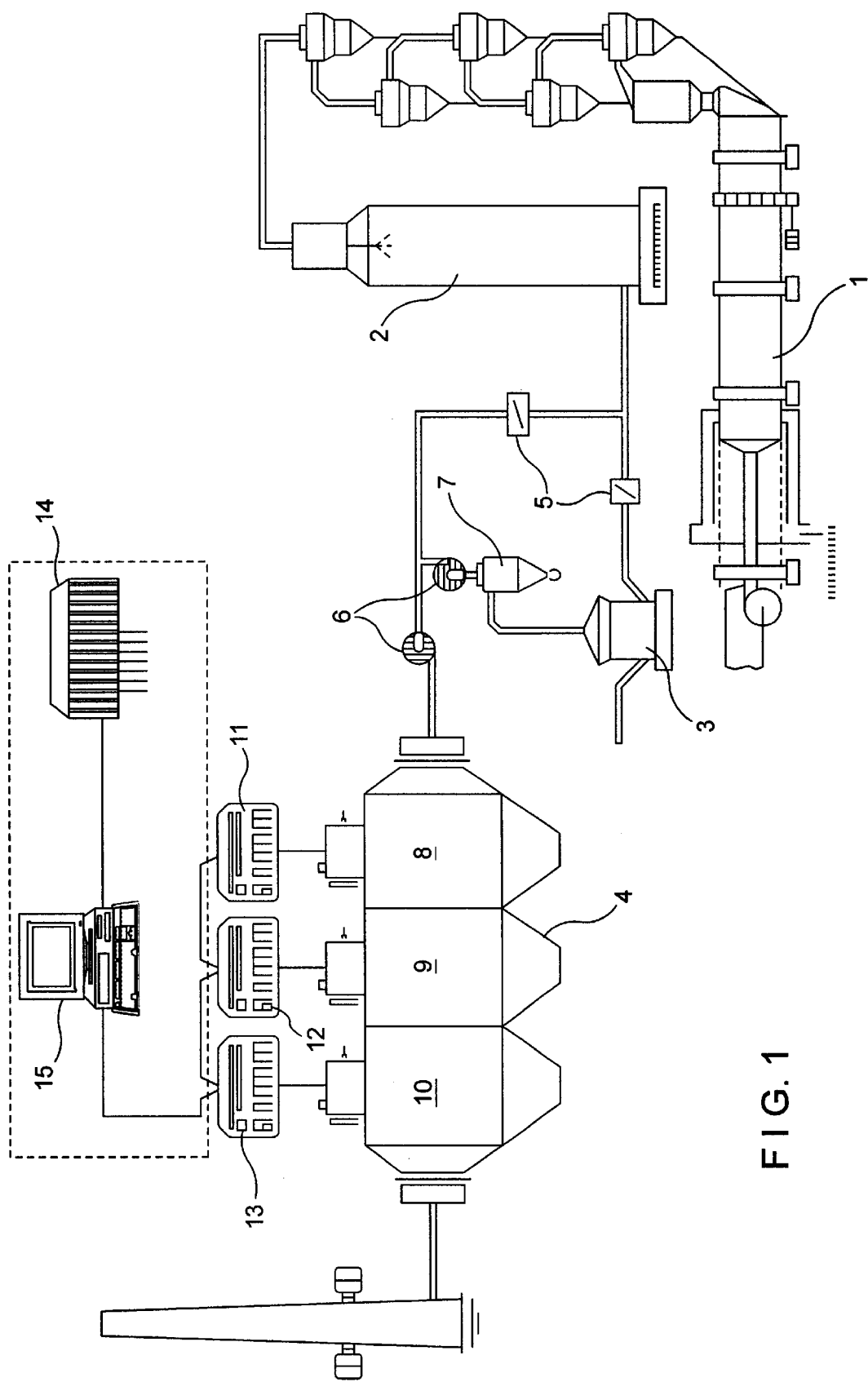

METHOD OF REGULATING THE FLUE GAS TEMPERATURE AND VOLTAGE SUPPLY IN AN ELECTROSTATIC PRECIPITATOR FOR A CEMENT PRODUCTION PLANT

The present invention relates to a method of regulating the flue gas temperature in a cement production plant comprising a kiln, a flue gas conditioning device, a mill and an electrostatic precipitator, whereby the flue gas from the kiln is passed through the conditioning device and is from there conveyed either via the mill or directly to the electrostatic precipitator, whereby measurements are carried out in the flow path of the gas of the flue gas temperature before the electrostatic precipitator, and whereby the water is supplied to the flue gas for cooling purposes in the conditioning device as a response to this temperature measurement, provided the temperature is too elevated.

In connection with cement production plants a considerable cooling of the flue gas occurs in the mill during its passage through the mill. Thus, in usual operating conditions where the mill contributes to the cooling of the flue gas, there is only a modest need for further cooling in a flue gas conditioning device in order to hereby obtain the desired gas temperature in the electrostatic precipitator to allow optimum control of the precipitator and thus to obtain the best possible precipitation. In this connection a measurement of the flue gas temperature is usually carried out immediately prior to the flue gas entering the electrostatic precipitator, said measurement being used for controlling the supply of cooling water to the conditioning plant.

However, in some cases the mill is not capable of contributing with this cooling effect. Often, the mill in question has an excess capacity relative to the remaining plant thereby allowing the mill to produce a stock so as to permit exploitation of e.g. the differentiations in electricity prices by eliminating the need to operate in times of high electricity prices. Moreover, unpredicted production shutdowns are not uncommon. In operating conditions when the mill is not in operation, flue gas may occur with a substantially higher temperature than desired for the electrostatic precipitator. The temperature measurement before the electrostatic precipitator will react to this elevated temperature and as a result of this, water will be supplied to the flue gas in the conditioning device. Until the regulation of the temperature has occurred by means of the conditioning device, however, some time will lapse during which the operation of the electrostatic precipitator is not optimal due to the increased gas temperature.

It follows that it is the object of the present invention to provide a method of the type described above wherein the temperature regulation is effected more quickly in order to hereby reduce the duration of the period during which an elevated gas temperature prevails in the electrostatic precipitator.

In accordance with the invention this is obtained by a method of the type described in the introductory part which is characterised in that a measurement of the flue gas temperature is carried out prior to its introduction into the conditioning device, that a flow measurement of the flue gas is carried out, and that, on the basis of this temperature measurement and flow measurement, a required amount of water is established for cooling the flue gas to a desired temperature, and that this water amount is supplied to the flue gas.

By the method thus defined a considerable reduction is obtained of the period of time during which an increased flue gas temperature prevails in the electrostatic precipitator, and consequently a reduction of the amount of particles which, in this non-optimum operative state, passes through the electrostatic precipitator. Considerable savings in the amount of water used are also obtained, since the method according to the invention permits a considerably more accurate determination of the required cooling effect. Of course, this is of particular importance in areas with scarcity of water.

The invention also relates to a cement production plant comprising a kiln, a conditioning device, a mill and an electrostatic precipitator. According to the invention this plant is characterised in comprising means for determining the gas temperature before the conditioning device, means for determining the magnitude of the gas flow, and means for determining the amount of water required to reduce the gas temperature from the value measured to a desired value. By means of such plant it is possible to exercise the method described above and to obtain the advantages discovered in this connection.

Figure 2:
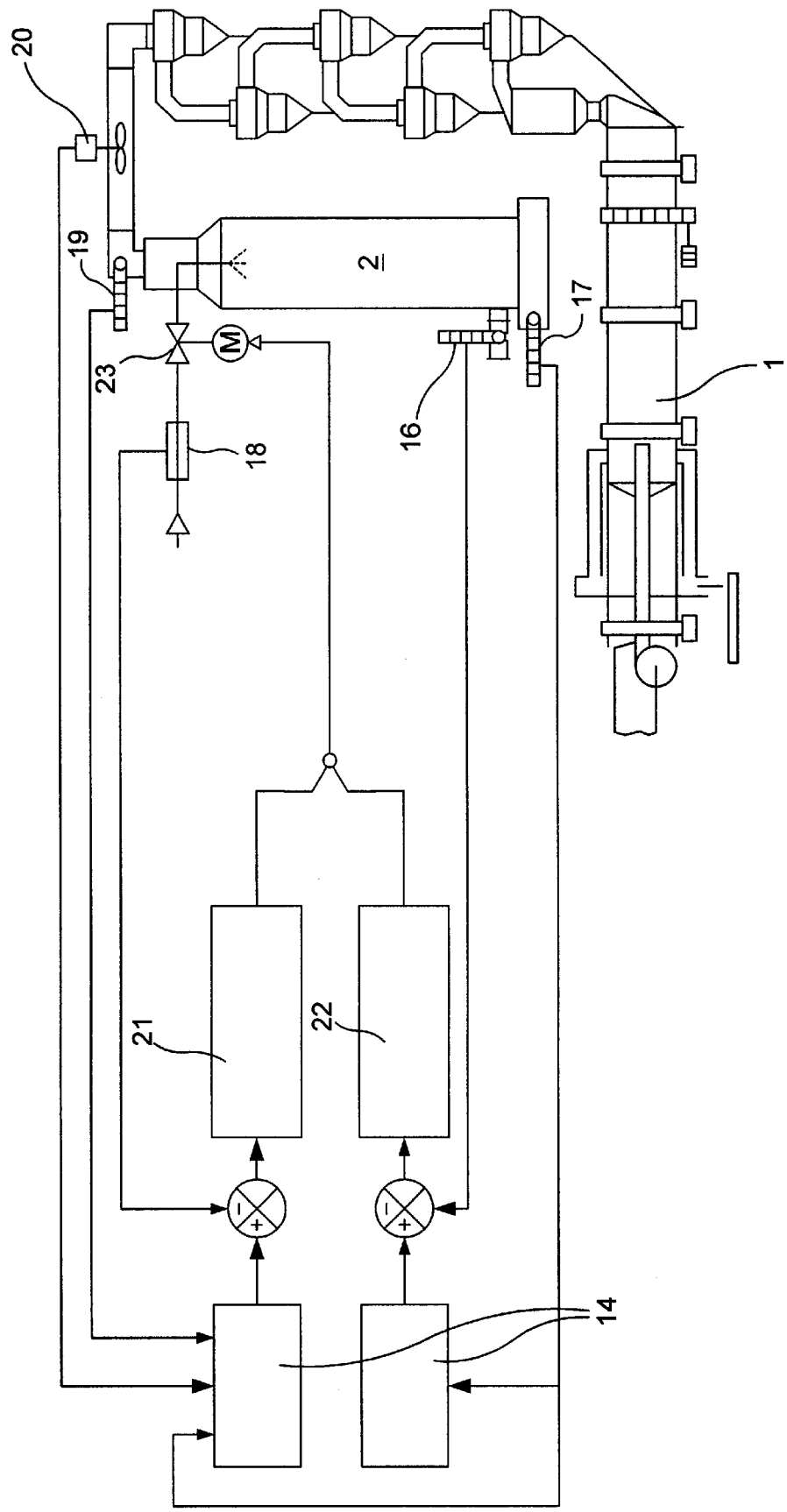
Figure 3:
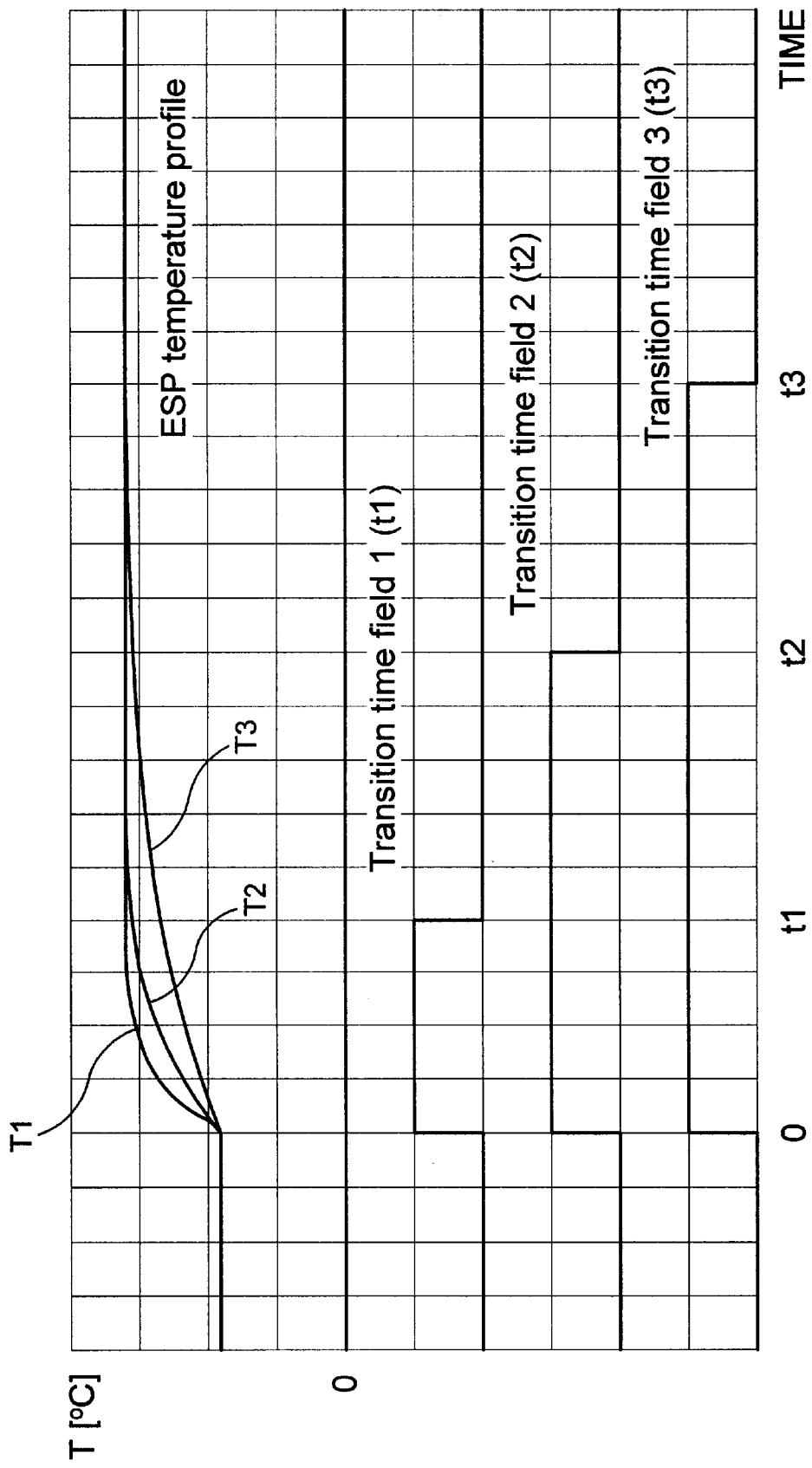

The method according to the invention will be explained in the following with reference to the drawings, wherein FIG. 1 schematically illustrates a cement production plant, FIG. 2 schematically illustrates a conditioning device of the plant shown in FIG. 1 with an associated control device, FIG. 3 schematically illustrates the temperature profile for three sections of an electrostatic precipitator, and the duration of the transition regulation for the three respective precipitator sections.

FIG. 1 illustrates a cement production plant comprising a kiln 1 with preheaters, a conditioning tower 2, a mill 3 and an electrostatic precipitator 4. Between the conditioning tower and the mill a by-pass for the gas flow is established. In the drawing, a throttle 5, blowers 6 and following the mill a mechanical separator 7 in the form of a cyclone separator.

The electrostatic precipitator comprises three precipitator sections 8,9,10 and to each of these a respective separate control unit 11,12,13 is coupled. The three control units receive input from a calculation unit 15 that, via a PLC (Programmable Logic Controller) 14, receives process data from the remaining part of the system, wherein the process data form the basis of the regulation.

FIG. 2 shows a part of the plant illustrated in FIG. 1, i.e., the kiln 1 and the conditioning tower 2. Moreover the control system intended for controlling the water supply is also shown therein. This control system comprises two separate systems, viz. a system that regulates in accordance with a temperature measurement before the electrostatic precipitator, and a system that regulates in accordance with a temperature measurement before the conditioning tower. An automatic switch for alternating between the two systems is provided, the switch being controlled by the operating state of the mill. During operation of the mill it is exclusively the first system with temperature measurement at the precipitator that is used whereas, e.g. in case of mill stops, for a transition period immediately following the mill stop it is the system with temperature measurement before the conditioning tower that is used.

For use in the first regulation a temperature sensor 16 is used to measure the temperature after the conditioning tower. This measurement is the determining parameter that regulates the water supply. Moreover, a temperature sensor 17 is used to carry out a measurement of the bottom temperature in the conditioning tower. This is effected in order to prevent the formation of sludge at the bottom of the tower resulting from excess supply of water.

For use in the second regulation a flow meter 18 is used to carry out a measurement of the water flow to the conditioning tower. This measurement constitutes the water-supply-determining regulation parameter. A temperature sensor 19 is used to carry out a measurement of the temperature before the conditioning tower and a flow meter 20 is used to measure the gas flow to the conditioning tower. Finally, like in the first regulation system, a temperature sensor 17 is used to measure the bottom temperature in the conditioning tower with a view to preventing the formation of sludge in the bottom area of the tower.

The measurement signals collected are recorded in the data collecting unit 14 and are communicated to the calculation unit 15. In this equipment the measurement results carried out are compared to a predetermined set-point. This comparison results in an output which is transmitted to a regulator 21,22 that controls a motor-operated valve 23 that regulates the water supply to the conditioning tower.

An electrostatic precipitator construction involves substantial amounts of material, mainly steel, and consequently the precipitator has a considerable heating capacity. In connection with transition periods where temperature changes occur in the precipitator, it means that some time will lapse before the temperature is uniform throughout the entire precipitator.

If the precipitator comprises a plurality of serially mounted sections, the varying operative states throughout the precipitator will entail that the precipitator is not optimally controlled. Therefore it is convenient to be able to control each precipitator section in correspondence with the temperature variation as a function of time. This is obtained by certain key parameters that regulate the power supplied to each precipitator section being continuously adjusted relative to the relevant prevailing temperature. This is performed by the central calculation unit 15 which continuously orders the control units 11,12,13 to modify these parameters.

The relevant parameters include:
the flow in the individual section which is regulated by means of the current limit and the so-called degree of intermittence,
the re-regulation rate of the current following a spark, and the spark frequency.

This means that the utility effect supplied to the precipitator and hence the performance of the precipitator is optimum during the transitional phase.

As will appear from FIG. 1, the electrostatic precipitator comprises three sections. FIG. 3 schematically illustrates how the temperature in the three sections vary with time when the gas temperature is increased. It also appears how transitional adjustments of different durations t1,t2,t3 for the three sections may advantageously be carried out in the transition period, the durations corresponding substantially to the existing temperature profile for the relevant section. Thus, it is obvious that the temperature in the section which is the first encountered in the flow path of the gas is the first to reach the increased value, and the section which is the last encountered in the flow path of the gas is the last to reach the increased value.

During period t1 the gas temperature is regulated by injection of water and the following is carried out in the first section: the frequencies of the back-corona measurements are adapted to the temperature profile, current reduction following spark is carried out in accordance with the actual current of the precipitator, and the re-regulation rate for the current is constantly maintained at a high value.

This means that the spark frequency may increase when the current reduction of the current decreases as a consequence of a reduced current intensity. Hereby optimum efficiency of the precipitator is obtained.

During the transition periods t2,t3 a corresponding regulation of the second and third precipitator section is carried out. In case of further precipitator sections a corresponding regulation is carried out during the transition period, in which case the transition period will have an increased duration.

What is claimed is:

1. A method for regulating a flue gas temperature ($T_1$) in a cement production plant and controlling an electrostatic precipitator in the cement production plant comprising a kiln, a flue gas conditioning device, a mill, and the electrostatic precipitator which includes a plurality of precipitator sections, the method comprising the steps of:

passing a flue gas from the kiln through the conditioning device;

conveying the flue gas from the conditioning device either via the mill or directly to the electrostatic precipitator;

performing a measurement of the flue gas temperature before the electrostatic precipitator; and supplying water to the flue gas for cooling purposes in the conditioning device as a response to the temperature measurement if the flue gas temperature is too elevated, wherein the performing step and the supplying step is executed using a flue gas regulating system and a control system, wherein the flue gas regulating system comprises:

i. a first system which regulates the amount of the supplied water in accordance with a temperature measurement between a gas exit of the conditioning device and a gas inlet of the electrostatic precipitator operating during the operation of the mill, and ii. a second system which regulates the amount of the supplied water by:

measuring the flue gas temperature ($T_1$) prior to its introduction into the conditioning device and measuring a flow ($V_g$) of the flue gas, and calculating the amount of water required for cooling the flue gas to a desired temperature on the basis of the measured $T_1$ and $V_g$ operating when the mill is not in operation, and iii. an automatic switch for alternating between the first system and the second system, and wherein the control system is provided for controlling the electrostatic precipitator when a temperature increase occurs in a transition period, a separate control of each precipitator section being carried out during the transition period, the controls performed in the transition period having different durations for the respective precipitator sections, the durations increasing in the flow direction of the flue gas.

2. A method according to claim 1, wherein the required amount of water is calculated exclusively on the basis of the temperature measurement and the flow measurement.

3. A cement production plant, comprising:

an electrostatic precipitator including a plurality of precipitator sections, the electrostatic precipitator having a flue gas inlet;

a kiln having a first flue gas outlet connected to a flue gas inlet of a conditioning device which includes a second flue gas outlet connected to the flue gas inlet of the electrostatic precipitator, either via a mill or directly;

means for supplying water to the flue gas for cooling purposes in the conditioning device as a response to the measurement of a temperature ($T_1$) of the flue gas before the flue gas inlet of the electrostatic precipitator if the temperature is too elevated;

a flue gas regulating system which includes:
  i. a first system which regulates the amount of the water being supplied by the supplying means in accordance with a measurement of the temperature between the second flue gas outlet of the conditioning device and the flue gas inlet of the electrostatic precipitator operating during the operation of the mill, and
  ii. a second system which regulates the amount of the supplied water by:
    measuring the temperature ($T_1$) of the flue gas prior to its introduction into the conditioning device and measuring a flow ($V_g$) of the flue gas, and
    calculating the amount of water required for cooling the flue gas to a desired temperature on the basis of the measured $T_1$ and $V_g$ operating when the mill is not in operation, and
  iii. an automatic switch for alternating between the first system and the second system; and
a control system for controlling the electrostatic precipitator when a temperature increase occurs in a transition period, wherein a separate control of each precipitator section is carried out during the transition period, the controls performed in the transition period having different durations for the respective precipitator sections, the durations increasing in the flow direction of the gas.

4. A cement production plant according to claim 3, wherein the required amount of water is calculated exclusively based on the determined values of $T_1$ and $V_g$.

* * * * *

UNITED STATES PATENT AND TRADEMARK OFFICE
CERTIFICATE OF CORRECTION

PATENT NO. : 6,293,787 B1
DATED : September 25, 2001
INVENTOR(S) : Victor Reyes

Page 1 of 1

It is certified that error appears in the above-identified patent and that said Letters Patent is hereby corrected as shown below:

Column 1,
Line 52, "hereby" should read -- thereby --

Column 2,
Line 46, "viz." should read -- i.e., --

Column 3,
Line 46, "vary" should read -- varies --

Column 4,
Line 23, "is" should read -- are --
Line 42, "and" should be deleted

Column 5,
Line 7, "and" should be deleted

Signed and Sealed this

Second Day of July, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,293,787 B1
DATED         : September 25, 2001
INVENTOR(S)   : Victor Reyes It is certified that error appears in the above-identified patent and that said Letters Patent is hereby corrected as shown below:

<u>Title page,</u>
Item [73], Assignee, "Miljoa" should read -- Miljø --

Signed and Sealed this

Tenth Day of September, 2002

*Attest:*

*Attesting Officer*

JAMES E. ROGAN
*Director of the United States Patent and Trademark Office*